United States Patent [19]

Charbonneau et al.

[11] Patent Number: 5,498,073
[45] Date of Patent: Mar. 12, 1996

[54] CORNER JUNCTION FOR CABINET, AND ELECTRICAL CABINET COMPRISING SUCH JUNCTIONS

[75] Inventors: Michel Charbonneau, Bresson; Edmond Bossan, St. Marcellin; Kazimir Laboch, Meylan; Jean-Pierre Pin, St. Etienne De St. Geoirs, all of France

[73] Assignee: Schneider Electric SA, France

[21] Appl. No.: 318,440

[22] Filed: Oct. 5, 1994

[30] Foreign Application Priority Data

Oct. 18, 1993 [FR] France ................................. 93 12480

[51] Int. Cl.$^6$ .................................................. A47B 43/00
[52] U.S. Cl. ................. 312/257.1; 312/263; 312/265.4; 312/265.5; 312/265.3
[58] Field of Search ................. 312/257.1, 263, 312/265.2, 265.3, 265.4, 265.5, 111; 108/50, 192, 193, 91

[56] References Cited

U.S. PATENT DOCUMENTS

| 1,796,024 | 3/1931 | Hohler | 312/257.1 X |
|---|---|---|---|
| 2,710,785 | 6/1955 | Morin | 312/257.1 |
| 3,590,753 | 7/1971 | Blink et al. | 108/91 X |
| 3,680,899 | 8/1972 | Newcomer | 312/263 X |
| 3,919,603 | 11/1975 | Salvati et al. | 312/257.1 X |
| 3,981,251 | 9/1976 | Damberg | 108/154 |
| 4,078,847 | 3/1978 | Presnick | 312/111 X |
| 4,600,252 | 7/1986 | Barber | 312/265.5 X |
| 4,782,637 | 11/1988 | Eriksson et al. | 312/263 X |
| 5,020,866 | 6/1991 | McIlwraith | 312/265.4 |
| 5,165,770 | 11/1992 | Hahn | 312/265.4 |
| 5,202,818 | 4/1993 | Betsch et al. | 312/257.1 X |
| 5,250,752 | 10/1993 | Cutright | 312/265.4 X |
| 5,277,131 | 1/1994 | Fortsch | 108/50 |
| 5,292,189 | 3/1994 | Lau et al. | 312/265.3 |

FOREIGN PATENT DOCUMENTS

| 490813 | 2/1978 | Australia . |
|---|---|---|
| 1317272 | 1/1963 | France . |
| 2566222 | 12/1985 | France . |
| 1112547 | 5/1968 | United Kingdom . |
| 2231117 | 11/1990 | United Kingdom . |

*Primary Examiner*—Jose V. Chen
*Assistant Examiner*—Rodney B. White
*Attorney, Agent, or Firm*—Parkhurst, Wendel & Rossi

[57] ABSTRACT

A corner junction for a cabinet, including a gusset plate having two profile sections secured thereto and including two adjacent joining surfaces which extend perpendicularly to a plane of the profile sections. A foot having complementary joining surfaces is secured to the gusset plate, such that the complementary joining surfaces are received by and abut against the joining surfaces of the gusset plate. At least one protruding portion extends from the foot and at least one complementary notch is formed in the gusset plate or the profile sections, the complementary notch receiving the protruding portion to lock the foot from translating in a direction parallel to the longitudinal axis of the foot. Additionally, a securing device is provided to secure the foot to the gusset plate, by clamping the foot between the joining surfaces. The foot is adapted to engage the gusset plate by translation along a direction parallel to the plane of the profile sections. A parallelepipedic cabinet is provided which incorporates the corner junction, and which has a vertical support pillars which are individually removable without disassembling a roof frame or a base frame formed by the profile sections.

31 Claims, 8 Drawing Sheets

CORNER JUNCTION FOR CABINET, AND ELECTRICAL CABINET COMPRISING SUCH JUNCTIONS

BACKGROUND OF THE INVENTION

The invention relates in a general manner to the field of cabinets and enclosures, notably that of cabinets and enclosures used for housing electrical and/or electronic switchgear.

Its object is more particularly to achieve a corner junction for a cabinet or enclosure of this kind, enabling trihedral assembly of profiles and/or uprights, and a cabinet of appreciably parallelepipedic shape comprising a corner junction of this kind at each of its eight apexes.

Hereinafter, the term "cabinet" will designate both a cabinet or an enclosure.

In state-of-the-art manner, for example according to the documents FR-A-2,681,403, EP-A-402,276 and EP-A-144,995, a cabinet of this kind is made up of a parallelepipedic framework achieved with twelve identical hollow profile sections, assembled by means of corner junctions, and a covering dressing made up of panels. The corner junction is formed by a tripod, which may have a monobloc structure, whose three feet fit respectively inside the three corresponding profile sections.

A junction of this kind, which is at first sight very attractive, does however present several drawbacks in terms of cost, mechanical strength, flexibility of use, and convenience when fitting the electrical switchgear inside such a cabinet. First of all, the tripod is fragile since it is subjected to large mechanical stresses; it is also relatively complex due to its shape and consequently costly to manufacture. Moreover, the rigidity of this type of junction is not always satisfactory, as it depends greatly on the internal dimensions of the profile. Consequently, to obtain a good rigidity, the manufacturing tolerances of the profile have to be reduced, thereby inducing extra expense as far as profile turning is concerned. Moreover, as the feet of the tripod fit into the profile sections, it is impossible to disassemble one or the other of the vertical uprights of the framework once the four vertical covering panels of the cabinet have been removed, without having at least partially removed the roof of the cabinet beforehand, at least without deformation of the framework which is liable in turn to deform the profiles at the level of the corner junctions and thus reduce the strength of the framework. Finally, assembly by tripod is also very costly in terms of man-hours, as it requires tightening/ untightening of a large number of screws. This results in the person in charge of fitting the electrical switchgear inside the cabinet either wasting time in partially disassembling the roof to remove an upright of the framework in order to achieve a more convenient access to the inside of the cabinet, or accepting the inconvenience resulting from the presence of the four vertical uprights of the framework, which also represents a waste of time.

SUMMARY OF THE INVENTION

The object of the present invention is therefore to overcome these shortcomings.

According to a first feature of the invention, corner junction is provided for a cabinet, notably an electrical switchgear cabinet, designed to securedly join by means of securing means, on the one hand a plane frame formed by at least two profile sections which, joined together by means of a gusset plate, form a first salient angle, and on the other hand a foot presenting a longitudinal axis appreciably perpendicular to said plane frame and provided with two first surfaces parallel to the longitudinal axis and forming between them a second angle. According to the invention, the gusset plate comprises two second surfaces also parallel to the longitudinal axis, disposed symmetrically on each side of the plane bisecting the first angle, and forming between them a third angle appreciably complementary to 360° to the second angle, in such a way that the securing means ensures a clamping pressure between the first and second surfaces. The gusset plate and/or profile sections comprise fourth surfaces appreciably parallel to the plane frame, and the foot comprises fifth surfaces perpendicular to its longitudinal axis and designed to cooperate with the fourth surfaces, the foot being arranged to engage and fit in place by simple translation in a direction parallel to the plane frame.

Preferably, the third angle is equal to or slightly smaller than the angle complementary to 360° to the second angle, so as to ensure a jamming effect of the first surfaces between the second surfaces, and the second surfaces being for example able to cross along an imaginary line.

Preferably, the foot comprises in addition two sixth surfaces parallel to the plane bisecting the second angle.

In practice, the gusset plate can present a third surface parallel to said longitudinal axis, perpendicular to the plane bisecting the third angle, set back from the imaginary line and designed to cooperate with a screw or bolt whose axis is located in the plane bisecting the third angle, perpendicular to the longitudinal axis. Alternatively, the gusset plate comprises a corner piece presenting two wings which form between them the third angle and whose outline corresponds to the cross-section of the profile sections.

The foot can in addition receive an upright perpendicular to said plane frame.

According to a first particular embodiment of the corner junction, the two profile sections are hollow, so that the second surfaces can fit, at least partially, respectively into the two hollow profile sections and be welded to these profile sections. Preferably, the latter then each present a fourth surface internal to the profile and parallel to the plane frame, which bears on fifth surfaces which belong to the foot and which are perpendicular to the longitudinal axis, in such a way that the foot fits simultaneously by simple translation, in a direction parallel to the plane frame, into the hollow of each of the two profile sections.

According to a second particular embodiment of the corner junction, the fourth surfaces are achieved by openings made in the wings of the gusset plate, and the fifth surfaces are supported by spigots protruding out on the first surfaces.

According to a second feature of the invention, this involves a cabinet for electrical switchgear having the shape of a parallelepiped and comprising:

a base and a roof disposed horizontally and each comprising a rectangular plane frame formed by four profile sections joined together two by two by means of a gusset plate;

a plurality of vertical pillars joining the plane frame of the roof to the plane frame of the base;

eight corner junctions, as defined above respectively located at the eight apexes of the parallelepiped; and covering panels to dress the faces of the parallelepiped.

Preferably, each foot comprises in addition a fixing device for example by dovetail designed to receive an accessory such as a hinge-pin for a door hinge.

The pillars include either only hollow or closed uprights, respectively joining the feet of the corner junctions two by two, or only posts respectively joining intermediate points of the profile sections associated to the roof to corresponding intermediate points of the profile sections associated to the base, or any combination of such uprights and such posts.

Preferably, the profile sections forming the frame of the roof and/or base are identical. They can notably be integrated in the covering panels of the base and roof. In practice, they are hollow and present a rectangular or trapezoid cross-section whose faces facing the inside of the parallelepipedic volume are provided with regularly spaced perforations. In addition, they present a salient wing directed towards the outside of the cabinet and forming a first gutter which joins a second gutter associated to the foot.

Each foot can in addition comprise a spout to enable the water collected by the gutter to be removed.

According to a first embodiment of the uprights, the uprights are made from a first closed profile which has a cross-section having the shape of an isosceles-rectangular triangle whose right angle is directed towards the inside of the cabinet, whose two angles at the base respectively form two sealing edges directed towards the outside of the cabinet and whose two perpendicular sides are also provided with regularly spaced perforations.

According to a second embodiment of the uprights, the uprights are made from a second open profile which has two sealing edges directed towards the outside of the cabinet.

The gusset plates disposed at the eight apexes are designed to receive either fixing means for accessories, such as hoisting rings, means for adjusting the level of the cabinet, or means for fixing on a base.

The pillars of the cabinet according to the invention, in the form of uprights and/or posts, are therefore all individually removable without disassembling the base and/or roof.

BRIEF DESCRIPTION OF THE DRAWINGS

Other features and advantages will become more clearly apparent from the following detailed description, with reference to the figures, in which.

CORNER JUNCTION

Figure 1:
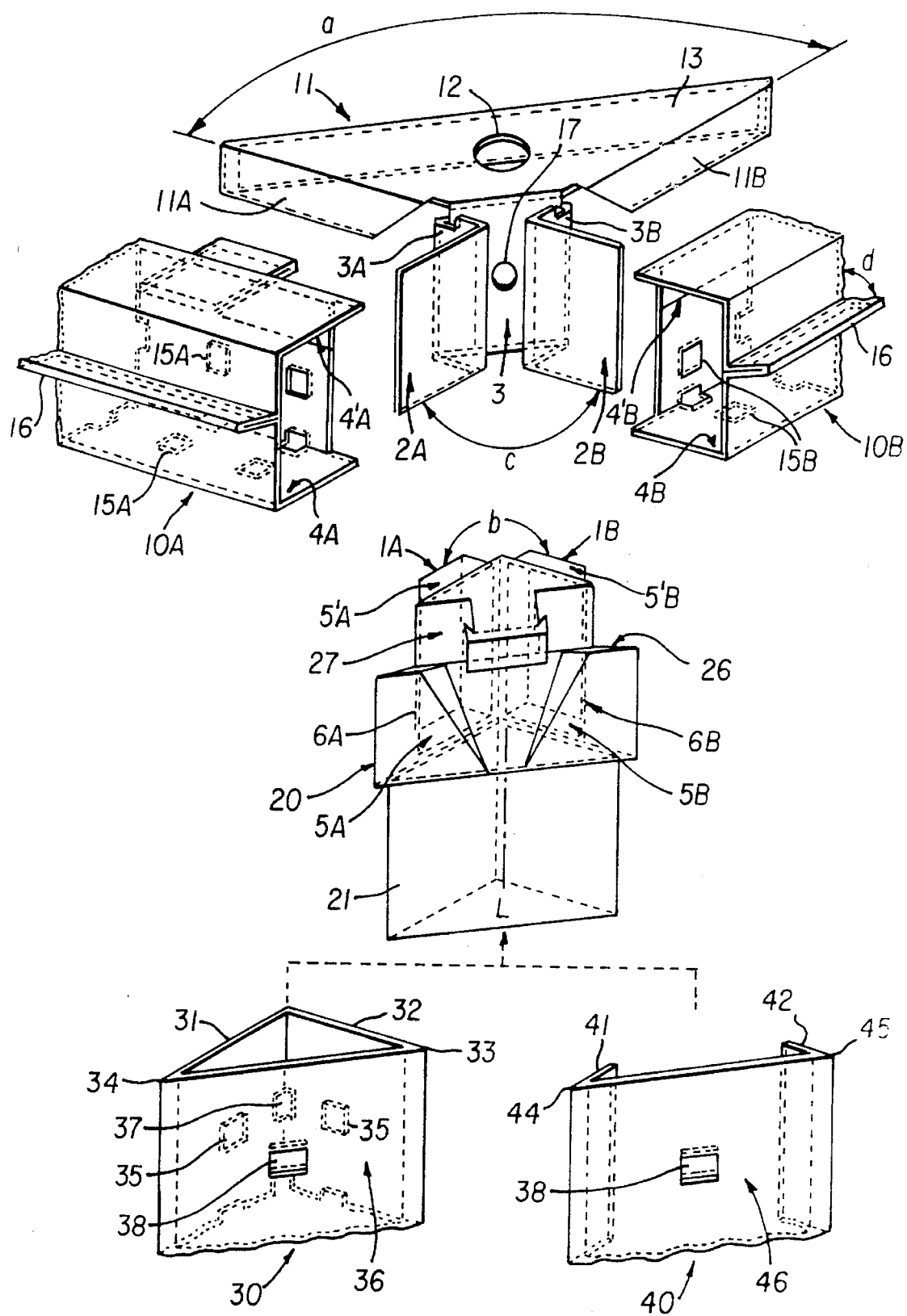
FIG. 1 is an exploded perspective view of a first embodiment of the corner junction according to the invention before assembly of the different elements.
Figure 2A:
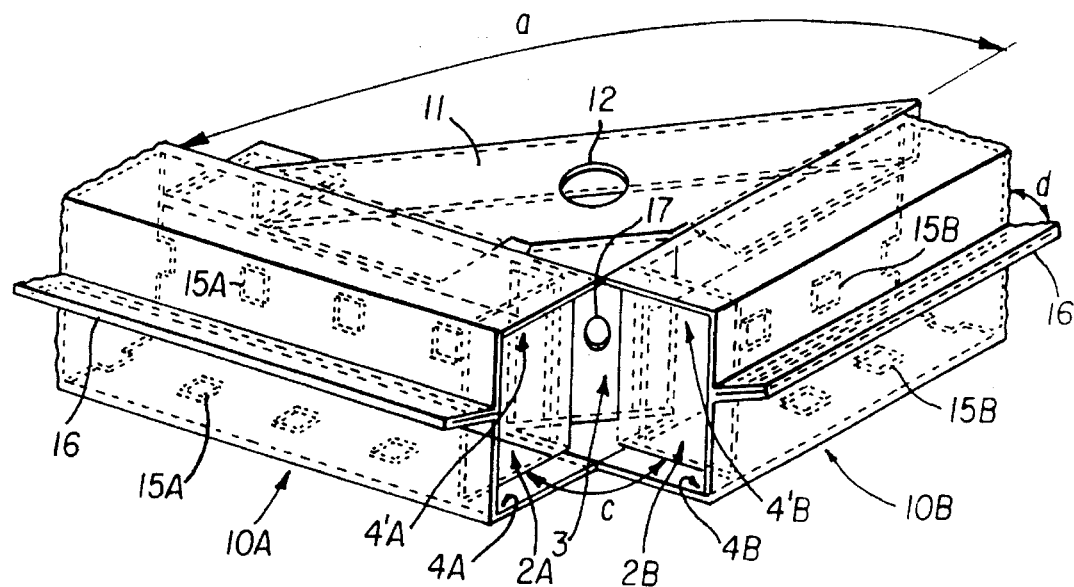
FIG. 2A is a perspective view of the plane frame according to FIG. 1 after assembly of the two profile sections, according to the first embodiment of the corner junction.
Figure 2B:
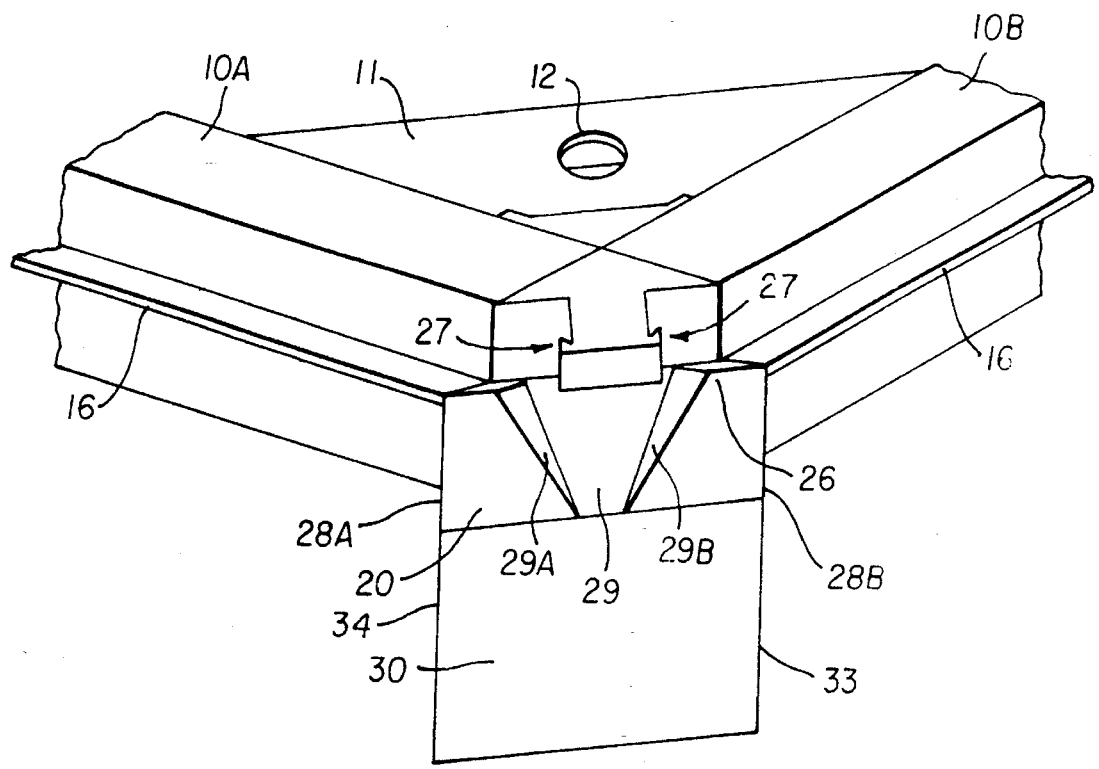
FIG. 2B is a perspective view of the first embodiment of the corner junction according to FIG. 1 after final assembly of the foot.

With reference to FIGS. 1, 2A and 2B, the corner junction according to a first embodiment of the invention is designed to securedly unite on the one hand two profile sections 10A and 10B, thus forming a plane frame, and on the other hand a foot 20 presenting a longitudinal axis L appreciably perpendicular to the frame 10 and provided with two first surfaces 1A and 1B parallel to the longitudinal axis L. The two profile sections 10A and 10B form between them a first salient angle a, and the surfaces 1A and 1B supported by the foot 20 form between them a second angle b.

The profile sections 10A and 10B are joined to one another by a gusset plate 11 which, preferably, is made from a cut and folded sheet metal plate. According to a possible embodiment, the gusset plate 11 comprises a plate 13 parallel to the plane frame and two wings 11A and 11B perpendicular to the plate 13, which are for example welded or screwed onto the profile sections 10A and 10B.

According to the invention, the gusset plate 11 comprises in addition two second surfaces 2A and 2B, perpendicular to the plane frame, and therefore parallel to the longitudinal axis L, respectively disposed on each side of the plane bisecting the angle a. These two second surfaces 2A and 2B form between them an angle c appreciably complementary to 360° to the angle b. Preferably, these two surfaces 2A and 2B do not meet at a common edge, but along an imaginary line, and are joined to one another by the surfaces 3A, 3 and 3B of the gusset plate 11 which are also parallel to the longitudinal axis L.

A securing means, for example a screw or bolt (not represented) fixed from the inside of the trihedron passes through a hole 17 made in the surface 3 of the gusset plate 11 which is perpendicular to the plane bisecting the angle a, and engages on a thread (not represented) tapped in the foot 20; the axis of this screw is located in the plane bisecting the angle c, perpendicularly to the longitudinal axis L, and therefore parallel to the plane frame. Inserting the screw or bolt from the outside of the trihedron can also be envisaged.

Preferably, the angle c is equal to or slightly smaller than the angle complementary to 360° of the angle b, so that when the screw is tightened, a clamping effect of the first surfaces 1A and 1B between the two second surfaces 2A and 2B is obtained. This clamping force is strengthened by the fact that the surfaces 2A and 2B meet along an imaginary line set back from the surface 3, the surfaces 3A, 3 and 3B acting as a spring fitted between the surfaces 2A and 2B. As a nonrestrictive example, the angle a=90°, angle b=270° and angle c between 88° and 90°.

A corner junction of this kind has a great strength on the one hand due to the presence of the gusset plate 11 which joins the two profile sections 10A and 10B rigidly, and on the other hand due to the fact that the stresses parallel to the longitudinal direction L are absorbed by the frictional forces of the surfaces 1A and 1B on the surfaces 2A and 2B following tightening of the screw. It moreover enables the manufacturing tolerances with respect to profile turning of the profile sections to be relaxed.

Furthermore, the foot 20 has the advantage of being removable by tightening/untightening a single screw, then simple translation of the foot 20 in a direction parallel to the plane frame and contained in the plane bisecting the angle c.

According to a particular embodiment, the profile sections 10A and 10B are hollow and the surfaces 2A and 2B fit respectively, at least partially, into the hollow of each of the two profile sections 10A and 10B, as can be seen in FIG. 2A. These two surfaces 2A and 2B can moreover be directly welded onto the inside of the profile sections 10A and 10B.

According to the same particular embodiment, the hollow profile sections 10A and 10B present a rectangular cross-section and therefore each have fourth surfaces 4A, 4'A, 4B and 4'B parallel to the plane frame, which act respectively as complementary supports for fifth surfaces 5A, 5'A 5B and 5'B belonging to the foot 20 and perpendicular to the longitudinal axis L. The foot 20 can then be likened to a tripod. It can be noted that sixth surfaces 6A and 6B which bound the first surfaces 1A and 1B laterally, parallel to the longitudinal direction L, are parallel to one another, thus enabling the first surfaces 1A and 1B to be fitted simultaneously, by simple translation according to a direction parallel to the plane frame and contained in the plane bisecting the angle c, into the profile sections 10A and 10B, against the second surfaces 2A and 2B. These sixth surfaces 6A and 6B are parallel to the plane bisecting the angle b.

Such embodiment gives an excellent strength as the stresses parallel to the longitudinal direction L are simultaneously absorbed on the one hand, by the frictions between the first surfaces 1A and 1B, and, the second surfaces 2A and 2B, and on the other hand by the bearing faces formed by the fourth surfaces 4A, 4'A, 4B and 4'B on the fifth surfaces 5A, 5'A, 5B and 5'B.

The foot 20 has a cross-section of general triangular shape and presents a part 21 of triangular cross-section on which, as an example, a hollow triangular upright 30 or an open upright 40 fits, the finality of which will be described in greater detail with reference to FIGS. 3, 4 and 5 relating to different embodiments of the cabinet.

FIGS. 8 to 12 correspond to a second embodiment of the corner junction according to the invention, in which the sections 10A and 10B have, for the sake of convenience, the same references as those described with respect to the first embodiment. The sections 10A and 10B are hollow and their cross-section is trapezoid, the two faces facing the inside of the corner junction being provided with perforations 15A and 15B.

Unlike the first embodiment, the gusset plate 11 can be formed by two distinct parts, i.e. an appreciably triangular plate 112 and a corner piece 113.

The plate 112 has a groove 112A forming a bracket in the plane of the plate in which the wings 100A and 100B associated respectively to the sections 10A and 10B fit. The plate 112 is then fixed to the sections 10A and 10B by welding according to the axis of the sections. It can be noted that this plate 112 is not indispensable within the scope of the invention, the gusset plate 111 being quite able to be formed simply by the corner piece 113.

This corner piece 113 is achieved by cutting and folding of a sheet metal plate and presents two wings 113A and 113B which form between them a concave angle c, preferably appreciably equal to 90°; the internal faces of the wings 113A and 113B bear the second surfaces 2A and 2B, perpendicular to the plane frame formed by the profile sections 10A and 10B.

The outline of the wings 113A and 113B preferably corresponds to the shape of the cross-section of the profile sections 10A and 10B, the corner piece 113 thus being able to be welded over practically the whole length of its perimeter respectively to the two profile sections 10A and 10B, so as to form the plane frame designed to receive a foot 120; welding moreover ensures the tightness of the corner junction once the foot 120 has been fitted.

The foot 120 presents a longitudinal axis perpendicular to the plane frame formed by the sections 10A and 10B, and comprises a part 121 on which for example a hollow upright 50 provided with two rows of holes 55 fits. The foot 120 is provided with two first surfaces 1A and 1B parallel to its longitudinal axis, and forming between them an angle b appreciably complementary to 360° to the angle c.

A clamping means (not represented), for example a nut and bolt, passes through an opening 117 of the corner piece 113 and a hole 127 of the foot 120 to press the two first surfaces 1A and 1B associated to the foot 120 against the two second surfaces 2A and 2B associated to the corner piece 113.

The corner piece comprises in addition two openings 115A and 115B, for example of rectangular shape, made respectively in the two wings 113A and 113B and designed to cooperate with two spigots 125A and 125B associated to the foot 120.

The openings 115A and 115B respectively present surfaces 114A, 114'A and 114B, 114'B, called fourth surfaces by analogy with the first embodiment, which cooperate with surfaces 5A, 5'A and 5B, 5'B supported by the spigots 125A and 125B, the latter being called fifth surfaces by analogy with the first embodiment.

It can be noted that the surfaces 126A and 126B called sixth surfaces, which bound the spigots 125A and 125B laterally, parallel to the longitudinal direction of the feet 120, are parallel to one another and to the plane bisecting the angle b, thus enabling the spigots 125A and 125B to be inserted simultaneously in the openings 115A and 115B by simple translation in a direction parallel to the plane frame.

In other words, the spigots 125A and 125B constitute the beginnings of two foots of a tripod which fit into the openings 115A and 115B and which, unlike the traditional tripod, enables the assembly formed by the foot 120 and upright 50 to be assembled and disassembled by simple translation parallel to the plane frame formed by the sections 10A and 10B.

Comparison of the two embodiments of the corner junction described above shows that the fifth surfaces 5A, 5'A and 5B, 5'B are supported by the foot 20 or 120; and the fourth surfaces, referenced 4A, 4'A, 4B and 4'B according to the first embodiment or 114A, 114'A, 114B and 114'B according to the second embodiment, belong respectively to the profile sections 10A, 10B or to the corner piece 113 of the gusset plate 111, welded to the profile sections 10A, 10B.

It can easily be understood that a combination of the two embodiments of the corner junction is also possible, i.e. two sets of fourth surfaces, one of which would belong to the profile sections 10A, 10B and the other of which would belong to the corner piece 113, these two sets of fourth surfaces bearing on two sets of fifth surfaces belonging to the foot.

The existence of these fourth and fifth bearing surfaces enables the shearing forces at the level of the clamping means to be minimized, forces which according to the studies carried out by the applicant, are particularly great when handling and transporting by road assembled cabinets comprising disassemblable corner junctions.

Cabinet

According to a feature common to the three embodiments of the cabinet which will be described hereafter with reference to FIGS. 3 to 7, the cabinet comprises a base S and a roof T, both comprising a rectangular frame formed by four profile sections 10 (FIGS. 6 and 7) joined together two by two by means of a gusset plate 11 or 111 and a foot 20 or 120 as described above. The cabinet therefore comprises eight identical corner junctions 20 or 120. Pillars formed by uprights 30, 40 or 50 and/or posts 70 join the frame of the roof T to that of the base S.

For the sake of clarity, FIGS. 3 to 7 only bear the references 11 and 20, it being understood that they also cover the references 111 and 120.

The covering dressing of the cabinet is formed by panels: i.e. one panel 60 for the roof T, one panel 61 for the base S, three panels 63, 64, 65 respectively for the left, rear and right vertical faces of the cabinet, and one panel in the form of a door 62 located at the front of the cabinet.

It can be noted that the profile sections 10 of the roof T and/or base S can be obtained by sectioning a corresponding profile section, or, according to a known technique, be directly integrated in the panels 60 and/or 61 by successive folding along the periphery of the plate forming the panel; the document DE-A-2,338,570 could for example be referred to for further details as far as the technique of integrating the profile sections in a dressing panel is concerned.

The profile sections 10 can also be provided with a protruding wing 16 (visible in FIGS. 1, 2A, 2B or 8), directed towards the outside of the cabinet. This wing 16 forms an angle d slightly less than 90° so as to form a gutter whose end acts as a bearing surface able to cooperate, if necessary, with a seal 80 fitted beforehand on the inside of the vertical panels 63 to 65 and of the door 62.

Each foot 20 or 120, located at each of the eight apexes of the cabinet, can be provided with a gutter 26 (visible in FIGS. 1 and 2B) situated in the continuation of the gutter formed by the wing 16, so as to ensure a continuity, over the whole periphery of the roof and that of the base, of the gutter and of the bearing surface designed to cooperate, if necessary, with the seal.

Each foot 20 or 120 can in addition comprise a spout 29 bounded by the faces 29A and 29B and designed to remove water collected by the gutter formed by the wings 16 (FIG. 2B).

It can be noted with reference to FIG. 2B that the wings 16, edges 28A and 28B of the part 21 of the foot 20, and edges 33 and 34 of the upright 30 form continuous bearing frames designed to cooperate with a seal 80.

Each foot 20 or 120 can in addition be provided with a fixing device 27, for example by dovetailing (visible in FIGS. 1 and 2B), directed towards the outside of the cabinet and designed to receive an accessory such as a hinge-pin (not represented) for a hinge (not represented) of a door 62. It can easily be understood that according to this feature the door can be fitted on any vertical face of the cabinet and that a cabinet can comprise one or more doors.

All the parts forming the cabinet are in general made of metal, except where otherwise indicated in the following text.

Figure 3:
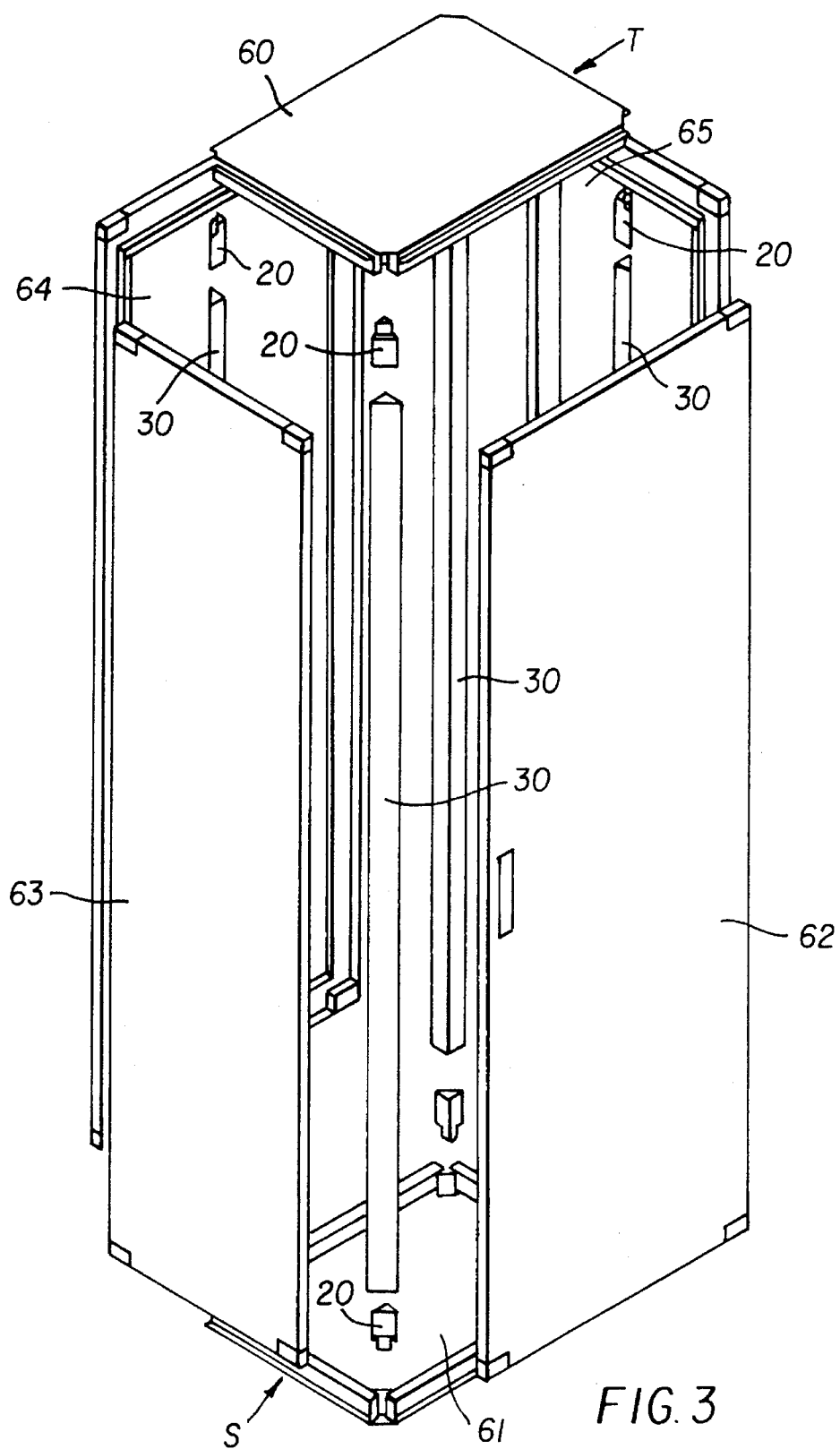
FIG. 3 is an exploded perspective view of a cabinet according to a first embodiment.
Figure 6:
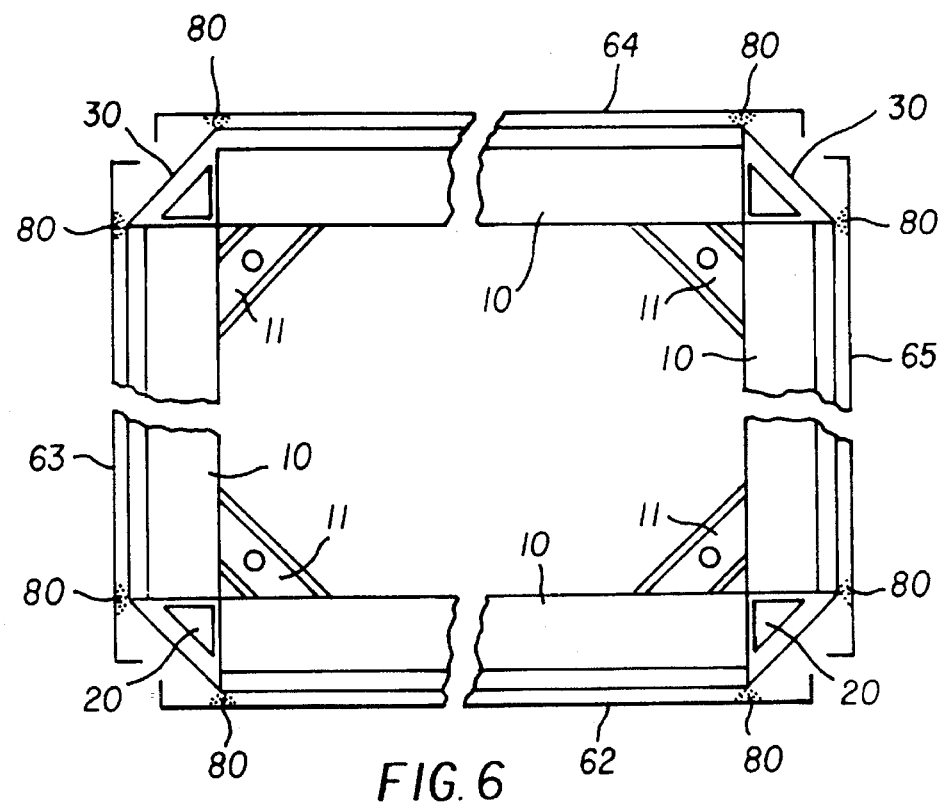
FIG. 6 is a horizontal cross-section of a cabinet according to the first embodiment.

According to a first embodiment illustrated by FIGS. 3 and 6, the four corner junctions associated to the four apexes of the roof T are respectively joined to the four apexes of the base S by four uprights 30 identical to the upright 30 of FIG. 1.

The upright 30 is hollow and closed and presents a cross-section having the shape of an isosceles-rectangular triangle inside which the part 21 of the foot 20 (visible in FIG. 1) having a complementary cross-section to that of the hollow of the upright 30 fits.

For each of the four uprights 30, the right angle of the triangle bounded by the faces 31 and 32 is directed towards the inside of the cabinet, whereas the two edges 33 and 34 situated at the base are directed towards the outside of the cabinet and form bearing surfaces for possible seals 80 fitted beforehand on the inside of the vertical panels 63 to 65 and door 62. The two faces 31 and 32 are provided with perforations 35 regularly spaced apart according to the longitudinal axis L and which pair up with the perforations 15A and 15B of the profile sections associated to the frames of the roof T and base S. The edge formed by the faces 31 and 32 is also provided with regularly spaced apart perforations 37, able to be used for inserting nuts for fixing screws passing through the perforations 35. The side 36 corresponding to the hypotenuse of the rectangular triangle is solid, but may be provided with knock-out parts 38, which once knocked out form a perforation able to receive fixing means for accessories.

According to this first embodiment, it can be easily understood that the uprights 30 perform at the same time a mechanical support function of the roof T and a tightness function in association with the covering panels. Each upright 30 is thus individually removable without removing the roof T, by simply untightening the screws associated to the two corresponding corner junctions, then translation in a horizontal direction contained in the plane bisecting the angle c. This results in the person in charge of fitting the electrical switchgear equipment inside the cabinet being able to remove one or two uprights 30 for easy access to the inside of the cabinet.

Figure 4:
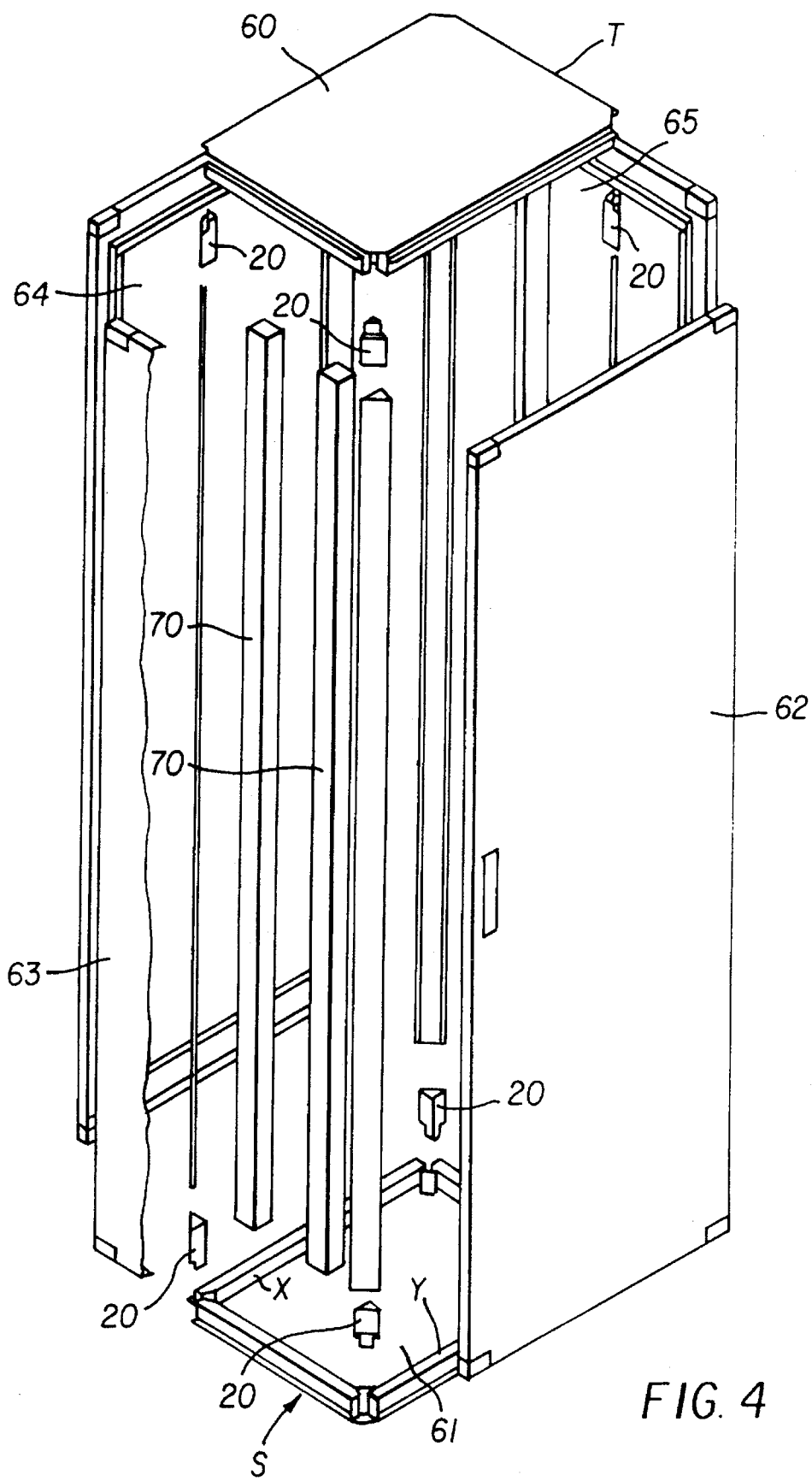
FIG. 4 is an exploded perspective view of a cabinet according to a second embodiment.
Figure 7:
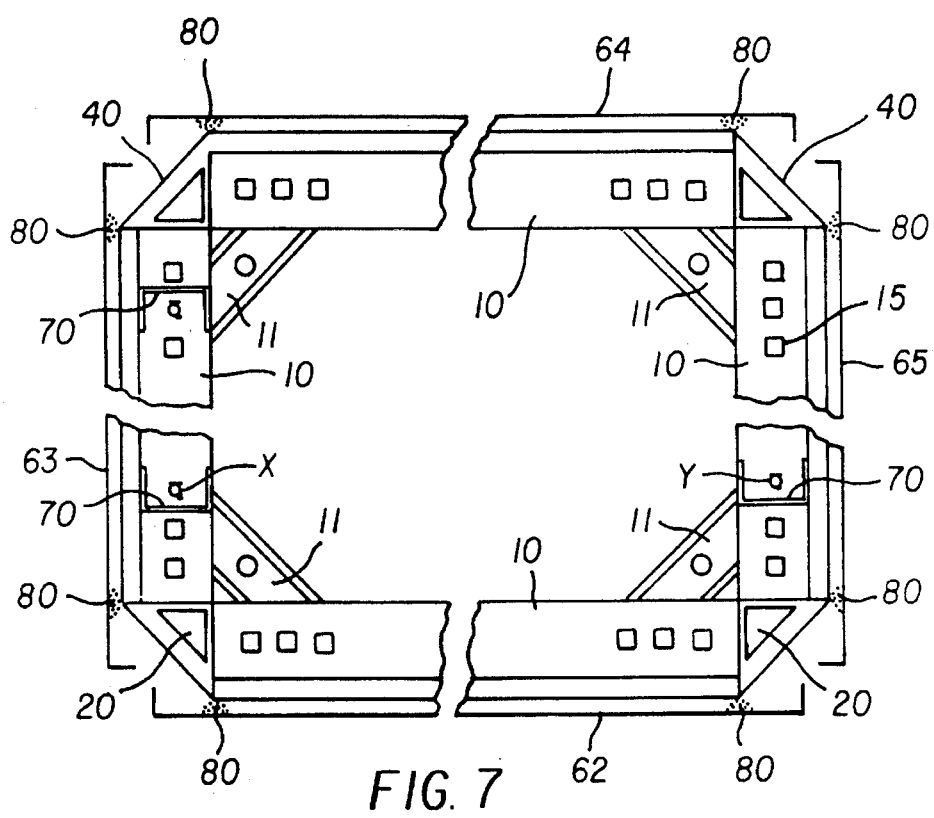
FIG. 7 is a horizontal cross-section of a cabinet according to the second embodiment.
Figure 8:
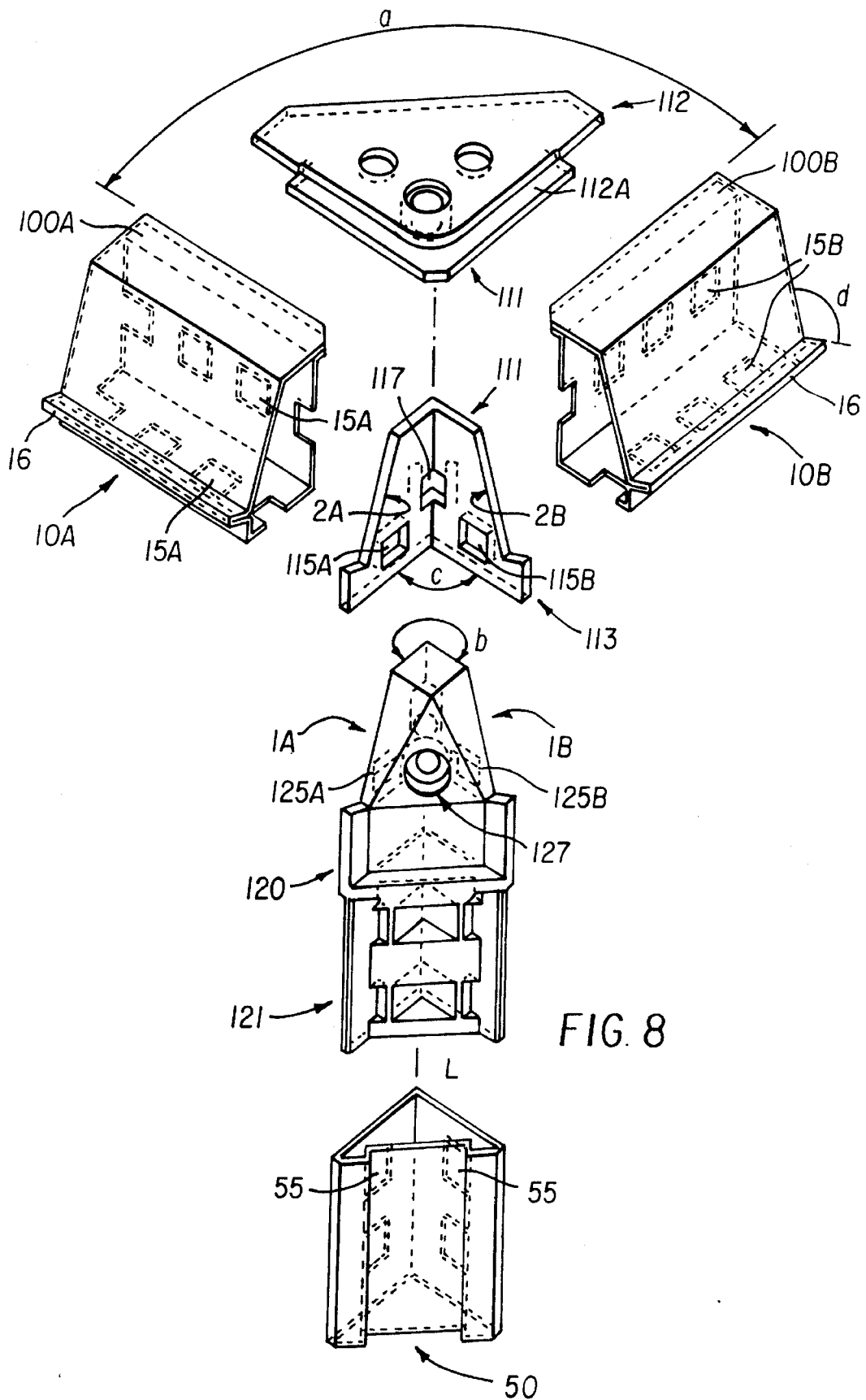
FIG. 8 is an exploded perspective view of a second embodiment of the corner junction according to the invention before assembly of the different elements.
Figure 9:
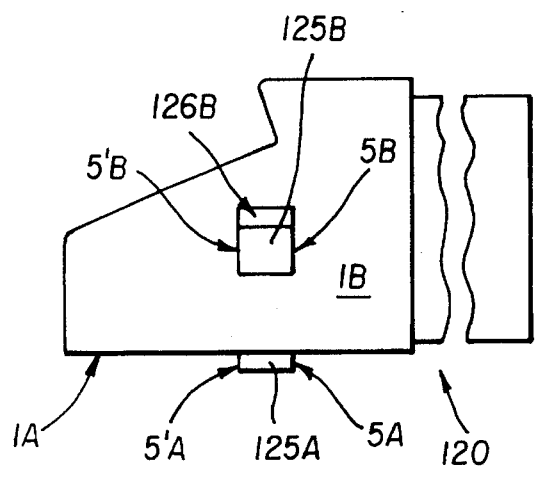
FIGS. 9 and 10 are respectively side and bottom views of the foot of the second embodiment of the corner junction according to FIG. 8.
Figure 10:
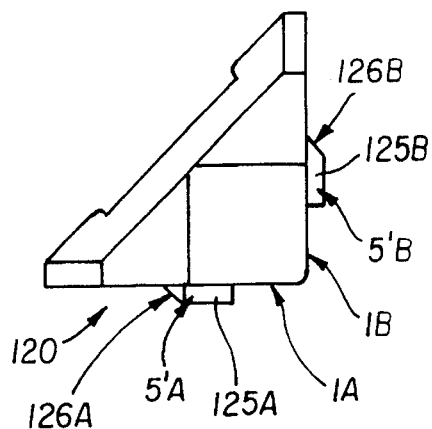
Figure 11:
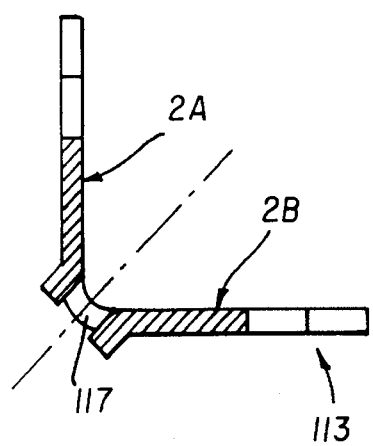
FIGS. 11 and 12 are respectively cross-sectional and perspective views of the gusset plate of the second embodiment of the corner junction according to FIG. 8.
Figure 12:
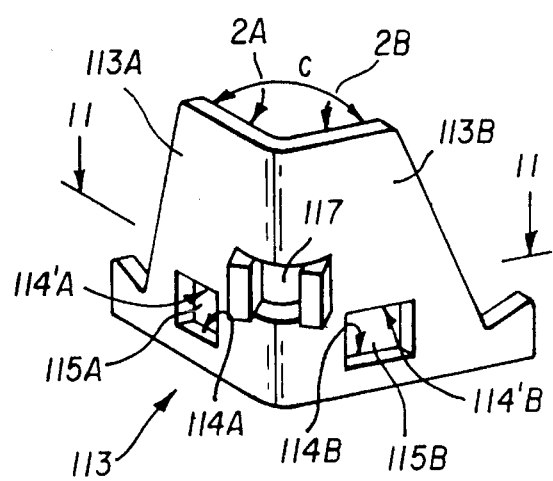

According to a second embodiment illustrated by FIGS. 4 and 7, the four corner junctions associated to the four apexes of the roof T are respectively joined to the four apexes of the base S by four uprights 40 identical to the upright 40 of FIG. 1.

The upright 40 is open and comprises three sides 41, 42 and 46 designed to receive the part 21 of the foot 20 (visible in FIG. 1).

Each of the four uprights 40 presents two end edges 44 and 45 facing the outside of the cabinet and forming bearing surfaces for possible seals 80 fitted beforehand on the inside of the vertical panels 63 to 65 and of the door 62. The side 46 joining the two edges 44 and 45 is solid.

The uprights 40 essentially perform a tightness function, as they obviously have a lower mechanical strength than the uprights 30 described with reference to the first embodiment. To strengthen the structure of the cabinet, vertical posts 70 are placed between the profile sections associated to the roof T and those associated to the base S. Each post 70 can be fixed, by means of screws (not represented) passing through the perforations 15, at any intermediate point X, Y of one of the four profile sections 10 associated to the base S to the corresponding intermediate point of the corresponding profile section associated to the roof T. It can be noted that the vertical posts 70 are also removable by simple horizontal translation and also have regularly spaced perforations (not represented), designed for fixing a frame supporting the electrical switchgear.

As the uprights 40 therefore only perform a tightness function, it is possible to envisage manufacturing them in plastic material.

This second embodiment of the cabinet according to the invention provides, in addition to the advantages already described with reference to the first embodiment, a very great degree of flexibility as far as the number of posts 70 and the position of each of the posts 70 is concerned, depending on the weight and size of the electrical switchgear and their spatial distribution in the internal volume of the cabinet.

Figure 5:
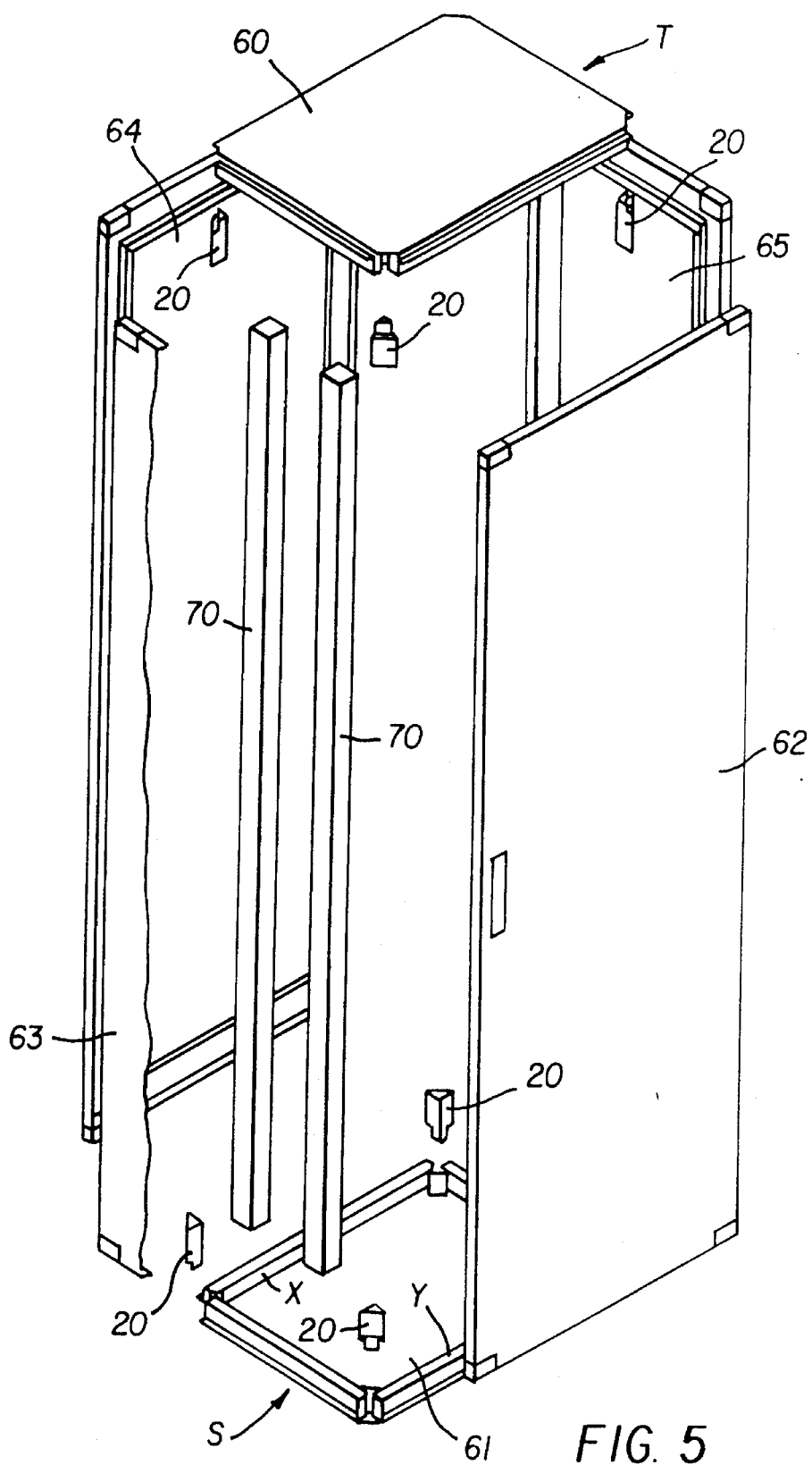
FIG. 5 is an exploded perspective view of a cabinet according to a third embodiment.

According to a third embodiment of the cabinet illustrated by FIG. 5, the pillars of the cabinet are formed solely by posts 70. In a similar manner to the second embodiment of the cabinet, each post 70 can be fixed, by means of screws passing through the perforations 15, at any intermediate point X, Y of one of the four profile sections 10 associated to the base S to the corresponding intermediate point of the corresponding profile section associated to the roof T. The vertical posts 70 are also removable by simple horizontal translation and also have regularly spaced perforations (not represented), designed for fixing a frame supporting the electrical switchgear.

The corresponding cabinet therefore does not present the feature of tightness with respect to the outside which the first and second embodiments of the cabinet present. It does however enable the four vertical edges of the parallelepiped formed by the cabinet to be completely cleared, and therefore gives the person in charge of fitting the switchgear maximum access space; in addition, it enables requirements to be met which do not in an initial stage demand a high protection index, while leaving the possibility of subsequently fitting uprights 30, 40 or 50 which enable a higher protection index to be achieved.

It can be noted from the three embodiments of the cabinet described above that any combination of uprights 30, 40 or 50, and/or posts 70 is possible according to the requirements expressed, provided that this combination meets the requirements of mechanical support, and that all the pillars resulting from this combination are removable by simple horizontal translation.

The cabinet according to the invention provides a very great degree of flexibility as far as the arrangement of the electrical switchgear in the cabinet is concerned, as well as great scope for possible future modifications and/or adaptations of an already installed cabinet.

It can easily be understood that in any of the embodiments comprising notably two pillars arranged in a plane parallel to the door 62 of the cabinet, these two pillars can in fact amount to a frame, either monobloc or not, for example in the form of a vertical rectangular plate which is fixed on the one hand onto two opposite profile sections of the roof and on the other hand onto two opposite profile sections of the base. In this case, the height of this rectangular plate will be at most equal to the distance separating the opposite internal faces of the profile sections of the roof T and base S so that the plate is removable by simple translation in a horizontal direction. Its width can on the other hand extend over the whole external width of the frames of the roof T and base S, so as on the one hand to provide a maximum amount of space available for the electrical switchgear, and on the other hand to enable continuity with a possible other plate of the same type belonging to an adjacent cabinet.

We claim:

1. A corner junction for a cabinet, comprising:

a gusset plate having two profile sections secured thereto, the profile sections extending along a plane and forming a first angle therebetween, said gusset plate including two adjacent joining surfaces extending perpendicularly to the plane of the profile sections and symmetrically with respect to a plane bisecting the first angle;

a foot having a longitudinal axis perpendicular to the plane of the profile sections, said foot having two adjacent complementary joining surfaces which extend parallel to the longitudinal axis and which are respectively received by and abut against the joining surfaces of the gusset plate, wherein the complementary joining surfaces form a second angle, and the joining surfaces of the gusset plate form a third angle which is not greater than about 360°—the second angle;

at least one protruding portion extending from the foot and having opposed locking surfaces which extend substantially perpendicularly to the longitudinal axis;

at least one complementary notch formed in at least one of the gusset plate and the profile sections for receiving said at least one protruding portion, said at least one complementary notch having complementary opposed locking surfaces which abut against the opposed locking surfaces of said at least one protruding portion; and securing means for securing the foot to the gusset plate by clamping the foot between the joining surfaces, wherein said foot is adapted to engage the gusset plate by translation along a direction parallel to the plane of the profile sections.

2. The corner junction of claim 1, wherein the third angle is less than about 360°—the second angle.

3. The corner junction of claim 1, wherein the third angle is equal to about 360°'—the second angle.

4. The corner junction of claim 1, wherein the joining surfaces lie in respective planes which intersect each other along an imaginary line, and said gusset plate further includes a backing plate which extends along a plane perpendicular to the plane of the profile sections and past the imaginary line, said backing plate cooperating with said securing means to secure the foot to the gusset plate.

5. The corner junction of claim 1, wherein the corner junction includes two protruding portions respectively extending from the two complementary joining surfaces of the foot, the protruding portions being bounded by lateral side surfaces which are parallel to each other.

6. The corner junction of claim 1, wherein said gusset plate includes a corner piece which forms the joining surfaces, said corner piece having an external contour which follows a cross-sectional shape of the profile sections.

7. The corner junction of claim 1, wherein said at least one complementary notch comprises at least one opening in said joining surfaces of the gusset plate, and said at least one protruding portion extends from the complementary joining surfaces of the foot.

8. The corner junction of claim 1, wherein the profile sections have a hollow interior bounded by internal walls which form said complementary notch, said joining and complementary joining surfaces being received in the hollow interior, between said internal walls.

9. The corner junction of claim 1, wherein said securing means comprises a bolt having a longitudinal axis extending along a plane bisecting the third angle, said foot being adapted to receive an upright extending perpendicularly to the plane of the profile sections.

10. The corner junction of claim 1, wherein the profile sections have a hollow interior bounded by internal walls, and the joining surfaces are respectively welded inside the hollow interior, to said internal walls.

11. A parallelepipedic cabinet for receiving electrical switchgear, comprising:

a rectangular base frame and a rectangular roof frame each comprising four sides formed by four profile sections, respectively, adjacent profile sections being joined together via corner junctions, each corner junction comprising (i) a gusset plate including two adjacent joining surfaces extending perpendicularly to a plane of its respective frame, and symmetrically to a plane bisecting its respective corner of the frame, (ii) a foot having a longitudinal axis perpendicular to the plane of its respective frame, said foot having two adjacent complementary joining surfaces which extend parallel to the longitudinal axis and which are respectively received by and abut against the joining surfaces of the gusset plate, wherein the complementary joining surfaces form a second angle, and the joining surfaces of the gusset plate form a third angle which is not greater than about 360°—the second angle, (iii) at least one protruding portion extending from the foot and having opposed locking surfaces which extend substantially perpendicularly to the longitudinal axis, (iv) at least one complementary notch formed in at least one of the gusset plates and the profile sections, for receiving the at least one protruding portion, the at least one complementary notch having complementary opposed locking surfaces which abut against the opposed locking surfaces of the at least one protruding portion, and (v) securing means for securing the foot to the gusset plate by clamping the foot between the joining surfaces, wherein said foot is adapted to engage the gusset plate by translation along a direction parallel to the plane of the respective frame;

a plurality of vertical pillars joining the base frame and the roof frame to each other; and a plurality of covering panels each covering a side of the parallelepipedic cabinet.

12. The cabinet of claim 11, wherein the pillars are individually removable without disassembling the base frame or the roof frame.

13. The cabinet of claim 11, wherein each foot includes a fixing device for securing the covering panels thereto.

14. The cabinet of claim 13, wherein one of said covering panels provides a door, the cabinet further comprising at least one hinge connecting the door to at least one of the fixing devices.

15. The cabinet of claim 11, wherein the pillars include at least two corner uprights respectively joining feet of opposing pairs of the corner junctions of the base frame and the roof frame.

16. The cabinet of claim 15, wherein each of the two corner uprights has first, second and third sides joined together such that each upright has an isosceles-right triangular cross-section, the first and second sides forming a right angle, each upright positioned such that the first and second sides face an interior of the cabinet, and the edges between the first and third sides and between the second and third sides form sealing edges, the first and second sides having regularly spaced perforations formed therein.

17. The cabinet of claim 15, wherein each of the two corner uprights has an open cross-section, having two opposite edges which form sealing edges.

18. The cabinet of claim 11, wherein the pillars include at least one post extending between an intermediate position of a profile section of the roof frame and an intermediate position of a profile section of the base frame.

19. The cabinet of claim 11, wherein the profile sections of at least one of the base frame and the roof frame are integrated with a covering panel.

20. The cabinet of claim 11, wherein each of the profile sections is hollow and includes an interior side facing an inside of the cabinet, said interior side has a plurality of regularly spaced perforations formed therein, and each profile section has an outward wing portion forming a first gutter.

21. The cabinet of claim 20, wherein each foot includes second gutters extending from the first gutters of the profile sections, and a spout extending from the second gutters.

22. The cabinet of claim 11, further comprising a hoisting ring secured to each of the gusset plates of the roof frame.

23. A parallelepipedic cabinet for receiving electrical switchgear, comprising:

a rectangular base frame and a rectangular roof frame each comprising four sides formed by four profile sections, respectively, adjacent profile sections being joined together via a corner junction;

a plurality of vertical pillars joining the base frame and the roof frame to each other, wherein the pillars include at least one post extending between an intermediate position of a profile section of the roof frame and an intermediate position of a profile section of the base frame;

a plurality of covering panels each covering a side of the parallelepipedic cabinet, wherein each of the pillars is individually removable from the parallelepipedic cabinet without disassembling the base frame or the roof frame.

24. The cabinet of claim 23, wherein each corner junction includes a fixing device for securing the covering panels thereto.

25. The cabinet of claim 24, wherein one of said covering panels provides a door, the cabinet further comprising at least one hinge connecting the door to at least one of the fixing devices.

26. The cabinet of claim 23, wherein the pillars include at least two corner uprights respectively joining opposing pairs of corner junctions of the base frame and the roof frame.

27. The cabinet of claim 26, wherein each of the two corner uprights has first, second and third sides joined together such that each upright has an isosceles-right triangular cross-section, the first and second sides forming a right angle, each upright positioned such that first and second sides face an interior of the cabinet, and the edges between the first and second sides and between the second and third sides form sealing edges, the first and second sides having regularly spaced perforations formed therein.

28. The cabinet of claim 26, wherein each of the two corner uprights has an open-cross section, having two opposite edges which form sealing edges.

29. The cabinet of claim 23, wherein the profile sections of at least one of the base frame and the roof frame are integrated with a covering panel.

30. The cabinet of claim 23, wherein each of the profile sections is hollow and includes an interior side facing an inside of the cabinet, said interior side has a plurality of regularly spaced perforations formed therein, and each profile section has an outward wing portion forming a first gutter.

31. The cabinet of claim 30, wherein each corner junction includes second gutters extending from the first gutters of the profile sections, and a spout extending from the second gutters.

* * * * *